(12) United States Patent
Stephens

(10) Patent No.: US 8,081,967 B2
(45) Date of Patent: Dec. 20, 2011

(54) METHOD TO MANAGE MEDIUM ACCESS FOR A MIXED WIRELESS NETWORK

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 1796 days.

(21) Appl. No.: 10/832,715

(22) Filed: Apr. 26, 2004

(65) Prior Publication Data

US 2005/0239455 A1 Oct. 27, 2005

(51) Int. Cl.
*H04W 4/00* (2009.01)
(52) U.S. Cl. ............... 455/426.2; 455/552.1; 455/553.1; 455/561
(58) Field of Classification Search ............... 455/426.2, 455/552.1, 553.1, 561, 127.4; 370/338, 442, 370/461
See application file for complete search history.

(56) References Cited

U.S. PATENT DOCUMENTS

| | | | |
|---|---|---|---|
| 5,793,757 A | 8/1998 | Uddenfeldt et al. | |
| 6,014,705 A | 1/2000 | Koenck et al. | |
| 6,381,239 B1 | 4/2002 | Atkinson et al. | |
| 6,714,530 B1 * | 3/2004 | Haartsen et al. | 370/347 |
| 6,895,255 B1 * | 5/2005 | Bridgelall | 455/552.1 |
| 2003/0161279 A1 * | 8/2003 | Sherman | 370/328 |
| 2004/0013135 A1 * | 1/2004 | Haddad | 370/493 |
| 2004/0114618 A1 * | 6/2004 | Tong et al. | 370/431 |

FOREIGN PATENT DOCUMENTS

| | | |
|---|---|---|
| JP | 2001-160824 A | 12/2001 |
| TW | 522741 | 3/2003 |
| TW | 548918 | 8/2003 |
| TW | 582142 | 4/2004 |
| TW | I287919 A | 10/2007 |
| WO | WO 02/05491 | 1/2002 |
| WO | WO 02/41586 | 5/2002 |
| WO | 2005/109770 A1 | 11/2005 |

OTHER PUBLICATIONS

Pending U.S. Appl. No. 10/446,565 to Adrian Stephens, filed May 27, 2003, "Multiple Mode Support in a Wireless Local Area Network".
Search Report received for Malaysian Patent Application No. PI 20051801, mailed on Sep. 12, 2008, 3 pages.
Office Action received for European Patent Application No. 05736535.5, mailed on May 7, 2008, 3 pages.
Office Action received for Chinese Patent Application No. 200580013215.6, mailed on Oct. 30, 2009, 16 pages.

* cited by examiner

*Primary Examiner* — Wayne Cai
(74) *Attorney, Agent, or Firm* — Cool Patent, P.C.; Joseph P. Curtin

(57) ABSTRACT

Briefly, in accordance with one embodiment of the invention, an access point may provide multiple access to a single medium by providing time division multiple access to the medium.

20 Claims, 4 Drawing Sheets

METHOD TO MANAGE MEDIUM ACCESS FOR A MIXED WIRELESS NETWORK

BACKGROUND

In advancing wireless technology, many devices will exist that operate using one or more of various wireless standards. Such wireless devices may be operating within the same environment and thereby access the same medium. For example, a legacy device may still operate with access points that are developed to communicate in accordance with newly developed standards. Newer devices and legacy devices may or may not be able to process communications from the other type of devices. Mechanisms to prevent communication collisions between legacy device communications and newly developed device communications may be necessary.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

Figure 1:
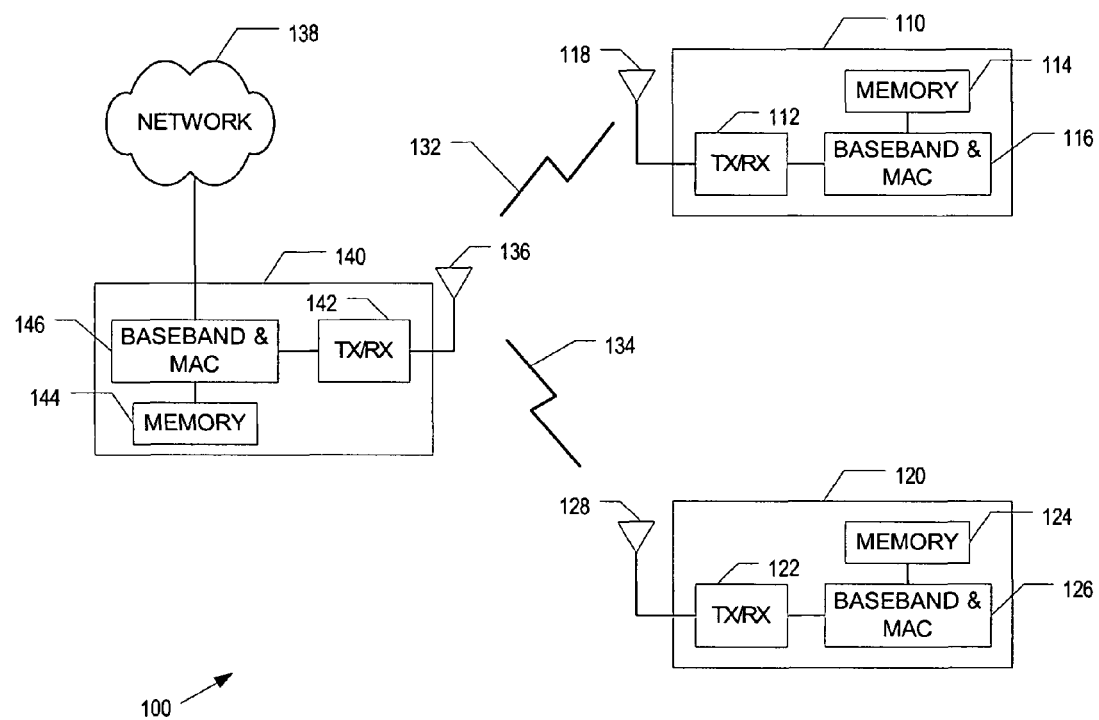
FIG. 1 illustrates a block diagram of a wireless local area network according to an embodiment of the present invention.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

FIG. 1 illustrates a block diagram of a wireless local area network according to an embodiment of the present invention. In the wireless local area network (WLAN) system 100 shown in FIG. 1, a first device 110 may include a wireless transceiver 112 to couple to an antenna 118 and to a baseband processor 116. Baseband processor 116 in one embodiment may include a single processor, or alternatively may include a baseband processor and an applications processor, although the scope of the invention is not limited in this respect. Baseband processor 116 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as baseband processor 116, or alternatively some portion or all of memory 114 may be disposed on an integrated circuit or other medium, for example a hard disk drive, that is external to the integrated circuit of baseband processor 116, although the scope of the invention is not limited in this respect. Likewise, a second device 120 may include a transceiver 122, memory 124, baseband processor 126, and antenna 128. Access point 140 may include a transceiver 142, memory 144, baseband processor 146 and antenna 136.

First device 110 and second device 120 may communicate with access point 140 via wireless communication links 132 and 134, respectively. Access point 140 may include at least one antenna 136. Alternatively, access point 140, and optionally first device 110 and second device 120, may include two or more antennas to provide a diversity antenna arrangement, to provide spatial division multiple access (SDMA), or to provide a multiple input, multiple output (MIMO) system, or the like, although the scope of the invention is not limited in this respect. Access point 140 may couple with network 138 so that first device 110 and second device 120 may communicate with network 138, including devices coupled to network 138, by communicating with access point 140 via wireless communication links 132 and 134. Network 138 may include a public network such as a telephone network or the Internet, or alternatively network 138 may include a private network such as an intranet, or a combination of a public and a private network, although the scope of the invention is not limited in this respect.

Communication between user first device 110 and second device 120 and access point 140 may be implemented in accordance with one or more wireless standards including, for example, one or more wireless cellular standards, one or more wireless networking standards, one or more radio frequency identification (RFID) standards, and/or others. In at least one implementation, for example, the communication is implemented in accordance with the Bluetooth short range wireless protocol (Specification of the Bluetooth System, Version 1.2, Bluetooth SIG, Inc., November 2003, and related specifications and protocols). Other possible wireless networking standards include, for example: IEEE 802.11 (ANSI/IEEE Std 802.11-1999 Edition and related standards), HIPERLAN 1, 2 and related standards developed by the European Telecommunications Standards Institute (ETSI) Broadband Radio Access Networks (BRAN), HomeRF (HomeRF Specification, Revision 2.01, The HomeRF Technical Committee, July, 2002 and related specifications), Ultrawideband, and/or others.

In accordance with one embodiment of the invention, access point 140 may be a multimode access point (MAP) in that access point 140 may allow first device 110 and second device 120 to communicate with access point 140 even though first device 110 and second device 120 may not be capable of communicating with one another, for example where first device 110 is arranged to communicate using a first wireless standard such as the IEEE 802.11a standard, and where second device 120 is arranged to communicate using a second wireless standard such as a higher throughput wireless communication standard directed toward, for example, operation at or near the 5 GHz frequency of the IEEE 802.11a standard, although the scope of the invention is not limited in this respect.

In one embodiment, WLAN system 100 includes multiple devices capable of communicating with first device 110 and access point 140. WLAN system 100 may include multiple other devices capable of communicating with second device 120 and access point 140. The multiple devices capable of communicating with first device 110 may all communicate using a first wireless standard such as the IEEE 802.11a standard. The multiple other devices capable of communicating with second device 120 may all communicate using a second wireless standard such as a higher throughput wireless communication standard directed toward, for example, operation at or near the 5 GHz frequency of the IEEE 802.11a standard, although the scope of the invention is not limited in this respect.

In accordance with one embodiment of the invention, access to the medium is controlled by a media access control (MAC) sublayer of the Data Link Layer as described in a wireless standard. In particular, MAC operations control which devices, AP 140, first device 110 and/or second device 120, can initiate communications over the medium.

In one embodiment, first device 110, second device 120, and access point 140 may be arranged to communicate over an identical or similar frequency band, for example near 5 GHz, wherein the transceivers 112, 122, and 142 of first device 110, second device 120, and access point 140, respectively, are arranged to operate on a compatible physical layer, although the scope of the invention is not limited in this respect.

In one embodiment, first device 110 may be a legacy device, operating according to an older wireless standard and second device may be a newly developed device, operating according to a newly developed or newer standard. According to the newer standard, second device 120 may be required to receive and process communications according to the older, legacy standard. In such embodiments, first device 110 may not be able to receive and honor communications according to the newer standard, for example, a new format wireless medium reservation made by access point 140, or may not receive or process medium reservation packets sent by second device 120, although the scope of the invention is not limited in this respect. Additionally, second device 120 may be able to receive and honor communications according to the older standard, for example, an old format wireless medium reservation made by access point 140, and may receive or process medium reservation packets sent by first device 110, although the scope of the invention is not limited in this respect. Because first device 110 cannot process communications from second device 120, protection mechanisms may be used to prevent first device 110 and second device 120 from initiating communications that can collide with communications of the other device. In accordance with one embodiment of the invention, access point 140 may allow both first device 110 and second device 120 to operate with access point 140 and with their peers without requiring a modification to the protocol under which the devices operate, although the scope of the invention is not limited in this respect.

Figure 2:
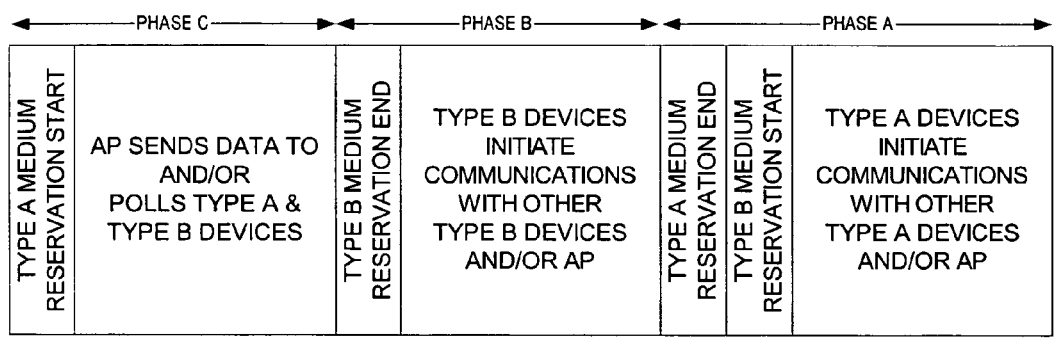
FIG. 2 illustrates a diagram of medium management operations according to an embodiment of the present invention.

As shown in FIG. 1, access point 140 may provide support for the mixture of two or more devices, such as first device 110 and second device 120, and may coordinate the operation of wireless local area network 100. In one embodiment of the invention, access point 140 may operate to divide time into multiple phases, a phase A, a phase B, and a phase C as shown in FIG. 2. Devices of a first type, for example first device 110, may initiate communication during phase A, and devices of a second type, for example second device 120, may initiate communication during phase B. Devices of the first type and the second type may both operate during phase C, although only when communication is initiated by access point 140, for example, by access point 140 polling each device for data or sending data to each device. Devices intended to operate during phase A may be referred to as type A devices, and devices intended to operate during phase B may be referred to as type B devices, although the scope of the invention is not limited in this respect.

During phase A, type A devices and access point 140 may be considered as a first subnetwork, subnetwork A, and during phase B, type B devices and access point 140 may be considered as a second subnetwork, subnetwork B, although the scope of the invention is not limited in this respect.

FIG. 2 illustrates a diagram of medium management operations according to an embodiment of the present invention. In wireless local area network 100, access point 140 may periodically transmit type A communications to provide privileged access to the medium for access point 140. Although the medium reservation operation shown in FIG. 2 is discussed with respect to using privileged access by way of example, the invention is not limited in this respect. In one embodiment, the medium reservation operation of FIG. 2 may be referred to as a privileged access operation to provide privileged access to the wireless medium for access point 140, although the scope of the invention is not limited in this respect.

As shown in FIG. 2, access point 140 may transmit a type A communication indicating the start of a medium reservation period that is received by all devices, type A devices and type B devices at the start of phase C. During phase C, access point 140 may initiate communication with type A devices and/or type B devices using a polling operation or sending data. During phase C, type A devices and type B devices are prevented from initiating communication because the medium is reserved.

At the beginning of phase B, access point 140 transmits a type B communication indicating an end to the reserved period for type B devices. The type B communication is received and processed by type B devices but cannot be processed by type A devices. During phase B, type B devices may initiate communications with other type B devices and/or access point 140, but type A devices are still operating under the medium reservation direction from access point 140 during phase C.

At the beginning of phase A, access point 140 transmits a type A communication indicating an end to the reserved period. Both type A devices and type B devices receive and process type A communications. Because now both a type A device and a type B device may initiate communications causing possible collisions, access point 140 transmits a type B communication indicating the start of a medium reservation period to prevent type B devices from initiating communications. Type A devices do not receive or understand type B communications. During phase A, type A devices may initiate communications with other type A devices and/or access point 140.

The medium management operations as shown in FIG. 2 may allow wireless local area network 100 to operate using time division multiple access, although the scope of the invention is not limited in this respect. In one embodiment of the invention, wireless local area network 100 may be based on carrier sense multiple access/collision avoidance (CSMA/CA) with medium reservation packets, although the scope of the invention is not limited in this respect.

In the example shown in FIG. 2, although there may be periods of inactivity for type B devices in phase B, devices of type A may be prevented from accessing the medium because of the medium reservation packet transmitted by access point 140 during phase C, although the scope of the invention is not limited in this respect. Likewise, though there may be periods of inactivity of for type A devices in phase A, devices of type B may be prevented from accessing the medium because of the medium reservation packet transmitted by access point 140, although the scope of the invention is not limited in this respect. The distributed medium access operation as shown in FIG. 2 may allow wireless local area network 100 to operate using adaptive time division multiple access by adjusting the duration of the phases, phase A, phase B, and phase C, according to the load it observes in the corresponding subnetworks, subnetwork A and subnetwork B, although the scope of the invention is not limited in this respect.

In one particular embodiment of the present invention, the medium management operations of wireless local area network 100 may generally be extended to any number of device types, N device types by dividing time into N+1 phases and operating the appropriate protocol during its respective phase, although the scope of the invention is not limited in this respect.

In the embodiment illustrated in FIG. 2, phase C is following by phase B and then phase A. In an alternate embodiment, phase A or phase B may be skipped. In a further embodiment, phase C may not include the sending of data or polling of type A and/or type B devices and immediately transition to another phase.

Figure 3:
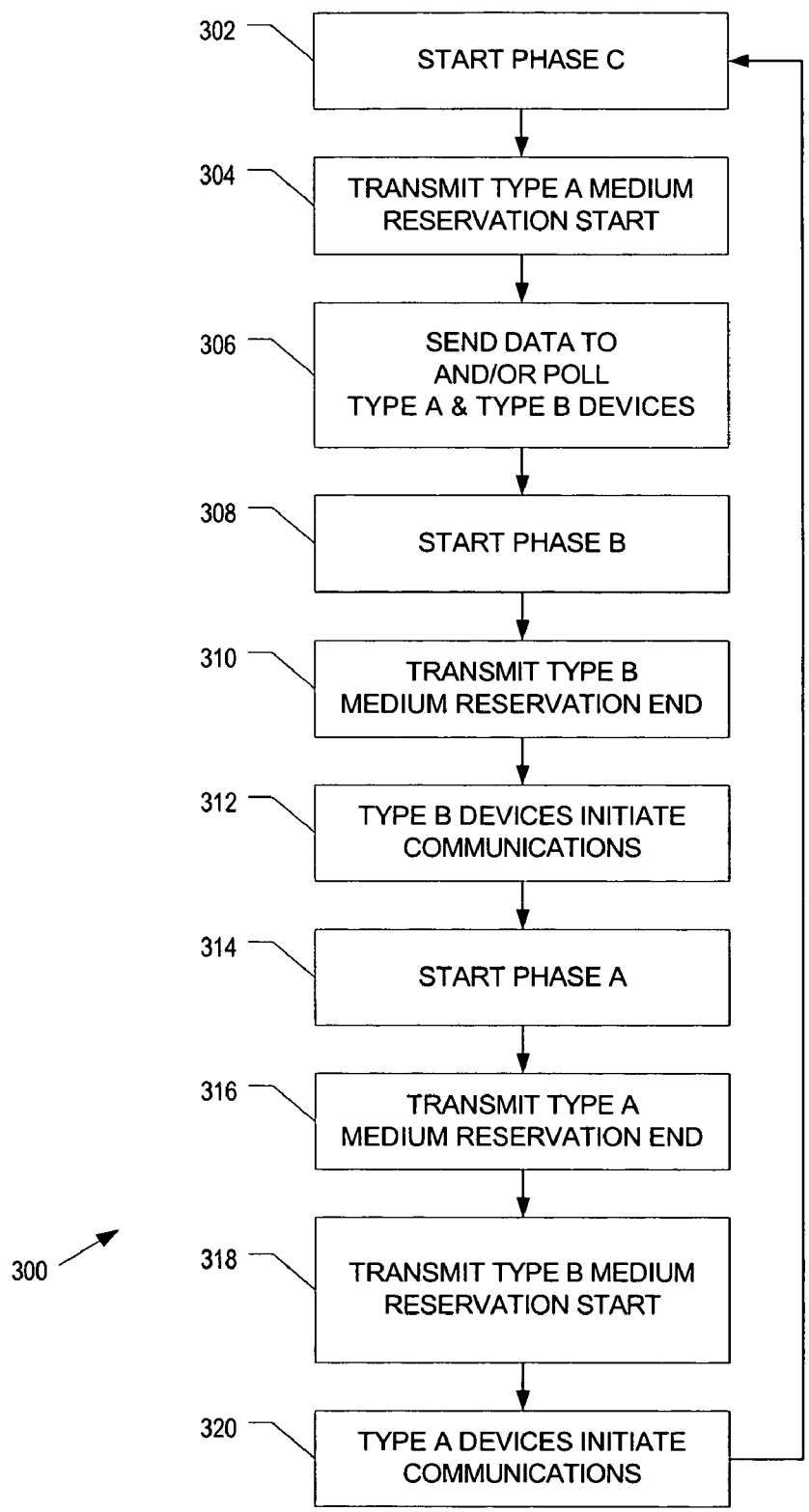
FIG. 3 is a flow diagram illustrating multiple mode support in a wireless local area network according to an embodiment of the present invention.

FIG. 3 is a flow diagram illustrating multiple mode support in a wireless local area network according to an embodiment of the present invention. Method 300 may be implemented by access point 140 and may be tangibly embodied as instructions stored on memory 144 of access point 140, although the scope of the invention is not limited in this respect. Method 300 may initiate by starting phase C at block 302. At the start of phase C, access point 140 may transmit a type A communication indicating the start of a medium reservation period at block 304 where the type A communication may include a privileged medium reservation to indicate to type A and type B devices to not initiate communications during phase C. As a result, access point 140 may initiate at block 306 communications with type A and with type B devices, for example, polling or sending data to type A and/or type B devices. After a predetermined time or after access point 140 is finished initiating communications, phase B starts at block 308. Access point 140 may transmit a type B communication at block 310 indicating an end to the medium reservation period started in phase C for type B devices. Type B devices can receive and process such type B communications, but type A devices may not. Type B devices may initiate communications with each other or with access point 140. Type A devices may not initiate communications during phase B. During phase B, type B devices can communicate at block 312 without interference from type A devices. After a predetermined period or after access point 140 determines it is appropriate, phase A starts at block 314. Access point 140 transmits a type A communication indicating the end of reservation period at block 316. Both type A and type B devices may receive and process type A communications. Access point 140 transmits a type B communication indicating the start of a medium reservation period at block 318. Only type B devices receive and process type B communications. Type A devices can initiate communications at block 320 without interference from type B devices.

Figure 4:
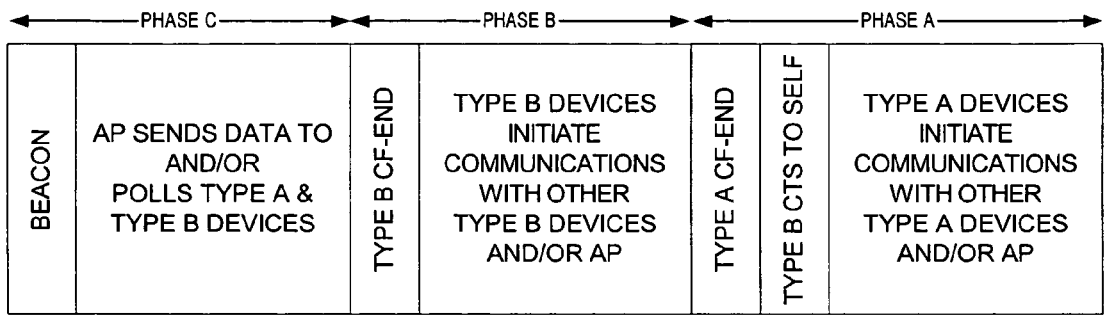
FIG. 4 illustrates a diagram of medium management operations according to an embodiment of the present invention.

FIG. 4 illustrates a diagram of medium management operations in accordance with, for example, wireless networking standard IEEE 802.11 according to an embodiment of the present invention. Type A devices may be arranged to communicate using a first wireless standard such as the IEEE 802.11a standard, and type B devices may be arranged to communicate using a second wireless standard such as a higher throughput wireless communication standard. In wireless local area network 100, access point 140 may periodically transmit a beacon to provide privileged access to the medium for access point 140. The beacon contains a contention-free period element which prevents all devices that receive the beacon from contending during this declared period. The declared period should be at least as long as phase C and phase B combined. Although the beacon medium reservation operation shown in FIG. 4 is discussed with respect to using privileged access by way of example, the invention is not limited in this respect. In one embodiment, the beacon medium reservation operation of FIG. 4 may be referred to as a privileged access operation to provide privileged access to the wireless medium for access point 140, although the scope of the invention is not limited in this respect.

As shown in FIG. 4, access point 140 may transmit a beacon indicating the start of a medium reservation period that is received by all devices, type A devices and type B devices, at the start of phase C. During phase C, access point 140 may initiate communication with type A devices and/or type B devices using a polling operation or sending data. During phase C, type A devices and type B devices are prevented from initiating communication because the medium is reserved.

At the beginning of phase B, access point 140 transmits a type B contention free period end (CF-END) communication indicating an end to the reserved period. The type B communication is received and processed by type B devices but cannot be processed by type A devices. During phase B, type B devices may initiate communications, but type A devices are still operating under the medium reservation direction from access point 140 during phase C.

At the beginning of phase A, access point 140 transmits a type A contention free period end (CF-END) communication indicating an end to the reserved period. Both type A devices and type B devices receive and process type A communications. Because now both type A devices and type B devices may initiate communications causing possible collisions, access point 140 transmits a type B clear to send (CTS) to self communication indicating the start of a medium reservation period to prevent second device 120 from initiating communications. Type A devices do not receive or understand type B communications. During phase A, type A devices may initiate communications.

The techniques described above may be embodied in a computer-readable medium for configuring a computing system to execute the method. The computer readable media may be permanently, removably or remotely coupled to system 101, 201 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method, comprising:
during a first phase, transmitting a first communication to indicate an end to a medium reservation period for devices of a first type; and
communicating with the devices of the first type during the first phase;
wherein devices of a second type are prevented from initiating communication during the first phase by the medium reservation period;
wherein the medium reservation period was initiated by a single communication received and processed by the devices of the first type and the devices of the second type; and
wherein the single communication indicates to devices of three or more types of devices not to transmit during phases that do not correspond to devices of the three or more types; and further comprising communicating with the devices of the three or more types during phases that correspond to devices of a respective one of the three or more types.

2. The method as recited in claim 1, wherein the communicating with the devices of the first type is initiated by the devices of the first type.

3. The method as recited in claim 1, further comprising:
during a second phase, transmitting a second communication to indicate an end to the medium reservation period for the devices of the first type and the devices of the second type; and
communicating with the devices of the second type during the second phase.

4. The method as recited in claim 3, wherein the communicating with the devices of the second type is initiated by the devices of the second type.

5. The method as recited in claim 3, further comprising during the second phase, transmitting a third communication to indicate a start to another medium reservation period for the devices of the first type.

6. The method as recited in claim 1, wherein the devices of the first type include devices to operate in compliance with a first communications standard, and
wherein the devices of the second type include devices to operate in compliance with a second communications standard.

7. The method as recited in claim 1, wherein the devices of the first type are able to process communications of the devices of the second type, and the devices of the second type are unable to process communications of the devices of the first type.

8. The method as recited in claim 1, wherein the devices of the first type operate at approximately the same frequency as the devices of the second type.

9. The method as recited in claim 1, wherein the single communication is a beacon that is periodically transmitted.

10. The method as recited in claim 1, wherein the single communication is a medium reservation packet.

11. An article comprising a storage medium having stored thereon instructions that, when executed by a computing platform, result in providing multiple access to a medium in a wireless local area network, the instructions to cause the computing platform to:

during a first phase, transmit a first communication to indicate an end to a medium reservation period for devices of a first type; and communicate with the devices of the first type during the first phase;

wherein devices of a second type are prevented from initiating communication by the medium reservation period;

wherein the medium reservation period was initiated by a single communication received and processed by the devices of the first type and the devices of the second type, and wherein the single communication indicates to devices of three or more types of devices not to transmit during phases that do not correspond to the devices of the three or more types; and further comprising communicating with the devices of the three or more types during phases that correspond to devices of a respective one of the three or more types.

12. The apparatus as recited in claim 11, wherein to communicate with the devices of the first type is in response to communications initiated by the devices of the first type.

13. The apparatus as recited in claim 11, the instructions further to cause the computing platform to:

during a second phase, transmit a second communication to indicate an end to the medium reservation period for the devices of the first type and the devices of the second type; and communicate with the devices of the second type during the second phase.

14. The apparatus as recited in claim 13, wherein to communicate with the devices of the second type is in response to communications initiated by the devices of the second type.

15. The apparatus as recited in claim 13, the instructions further to cause the computing platform to transmit a third communication to indicate a start to another medium reservation period for the devices of the first type.

16. The apparatus as recited in claim 11, wherein the devices of the first type include devices to operate in compliance with a first communications standard, and wherein the devices of the second type include devices to operate in compliance with a second communications standard.

17. The apparatus as recited in claim 11, wherein the devices of the first type are able to process communications of the devices of the second type, and the devices of the second type are unable to process communications of the devices of the first type.

18. The apparatus as recited in claim 11, wherein the devices of the first type operate at approximately the same frequency as the devices of the second type.

19. The apparatus as recited in claim 11, wherein the single communication is a beacon that is periodically transmitted.

20. The apparatus as recited in claim 11, wherein the single communication is a medium reservation packet.

* * * * *